United States Patent [19]

Kopatz et al.

[11] Patent Number: 4,880,605
[45] Date of Patent: Nov. 14, 1989

[54] GAS DISPERSION SHROUD FOR HIGH TEMPERATURE PROCESSING OF POWDERS

[75] Inventors: Nelson E. Kopatz, Sayre, Pa.; Philip E. Stermer, Waverly, N.J.; Lori S. Pruyne, Sayre, Pa.

[73] Assignee: GTE Products Corporation, Stamford, Conn.

[21] Appl. No.: 161,923

[22] Filed: Feb. 29, 1988

[51] Int. Cl.$^4$ .............................................. F27B 17/00
[52] U.S. Cl. .................................. 422/232; 75/0.5 B; 266/182
[58] Field of Search ............................. 422/232, 233; 48/DIG. 4; 75/0.5 B; 266/182, 202; 34/57 E

[56] References Cited

U.S. PATENT DOCUMENTS

| | | | |
|---|---|---|---|
| 2,025,402 | 12/1935 | Jacques | 422/23 L |
| 2,785,061 | 3/1957 | Teidmann | 75/0.5 B |
| 3,541,025 | 11/1970 | Oda et al. | 422/232 |
| 3,600,817 | 8/1971 | Klein | 34/57 E |
| 3,862,834 | 1/1975 | Van Waclowiczek et al. | 75/0.5 B |
| 4,146,359 | 3/1979 | Lumpkin et al. | 422/232 |

*Primary Examiner*—Peter Kratz
*Attorney, Agent, or Firm*—Donald R. Castle

[57] ABSTRACT

Apparatus is disclosed for reacting a powder with a gas comprising a shroud consisting of a first section having a peripheral cylindrical wall with inner surface and outer surface. Inner surface defines a cavity which serves as reaction chamber in which powder and gas react. First section is detatchably mounted at top end to exit nozzle of high temperature source. First section has powder inlet opening(s) extending through peripheral wall from outer surface to inner surface, thereby connecting the outside with reaction chamber through which powder enters the chamber. Powder inlet opening(s) are positioned sufficiently close to exit nozzle to allow powder to melt and react with gas in the molten state. Second section forms cylindrical jacket skirting lower part of first section at a point below powder inlet openings. Jacket has outer peripheral wall, inner wall one and same with peripheral wall of first section, and top and bottom ring plates forming top and bottom walls respectively of second section. Walls of second section define a plenum. Second section has outer opening(s) through outer peripheral wall of jacket connecting outside with plenum through which gas enters from outside to plenum. Second section has two or more inner openings through inner wall of second section, which connect plenum with chamber through which gas enters chamber from plenum to react with powder in chamber. Inner openings are directed downward into chamber and tangential to inner surface of shroud. Resulting reaction product exits shroud through bottom end of chamber.

2 Claims, 2 Drawing Sheets

GAS DISPERSION SHROUD FOR HIGH TEMPERATURE PROCESSING OF POWDERS

This invention relates to an apparatus for reacting a powder with a reacting gas at high temperatures. More particularly, the apparatus allows the gas to be adequately dispersed for the reaction to proceed efficiently. The preferred high temperature is achieved with a plasma.

BACKGROUND OF THE INVENTION

In high temperature processes involving powders and in particular metal powders, it is sometimes desirable to react the powder with a gas. For example, to achieve a low level of oxygen in a metal powder, it is desirable to react the powder with a reducing gas such as hydrogen. Or to produce a desired level of oxygen in the powder, it is desirable to react the powder with oxygen. In high temperature processes, such as in plasma processes, this is difficult to do because the nature of the high temperature equipment is limiting as far as dispersion of the reacting gas.

The present invention provides an apparatus which allows dispersion of the reacting gas in a high temperature process so that reaction of the powder with the gas can be carried out efficiently.

SUMMARY OF THE INVENTION

In accordance with one aspect of this invention, there is provided an apparatus for reacting a powder with a gas. The apparatus comprises a shroud consisting essentially of a first section having a peripheral cylindrical wall with an inner surface and an outer surface. The inner surface defines a cavity which serves as a reaction chamber in which the powder and the reacting gas react. The first section is detatchably mounted at its top end to the exit nozzle of a high temperature source. the first section has one or more powder inlet openings extending through the thickness of the peripheral wall from the outer surface to the inner surface, thereby connecting the outside with the reaction chamber through which the powder enters the reaction chamber. The powder inlet openings are positioned sufficiently close to the exit nozzle to allow the powder to melt and to react with the reacting gas in the molten state. The second section forms a cylindrical jacket skirting the lower part of the first section at a point below the powder inlet openings. The jacket has an outer peripheral wall, an inner wall which is one and the same with the peripheral wall of the first section, and top and bottom ring plates which form the top and bottom walls respectively of the second section. The walls of the second section define a plenum. The second section has one or more outer openings through the thickness of the outer peripheral wall of the jacket which connect the outside with the plenum through which the reacting gas enters from an outside source to the plenum. The second section has two or more inner openings through the thickness of the inner wall of the second section, which connect the plenum with the reaction chamber through which the reacting gas enters the reaction chamber from the plenum to react with the powder in the reaction chamber. The inner openings are directed downward into the reaction chamber and tangential to the inner surface of the shroud. The resulting reaction product exits the shroud through the bottom end of the reaction chamber.

DETAILED DESCRIPTION OF THE INVENTION

For a better understanding of the present invention, together with other and further objects, advantages and capabilities thereof, reference is made to the following disclosure and appended claims in connection with the above described drawings and description of some of the aspects of the invention.

The apparatus of the present invention allows a reacting gas to be dispersed in a high temperature reaction with a powder. The invention is especially suited to reactions in which fine metal or glass powders are involved. The powders can be elemental, alloys or agglomerates of elemental or alloy powders.

The term "reacting gas" as used in this invention can mean a single gas or more than one gas which have been mixed prior to being introduced into the apparatus.

The apparatus comprises a shroud which is attached to the exit nozzle of a high temperature source. The apparatus is particularly suited to be used in conjunction with plasma reactors.

Prior to the present invention, if high temperature treated powder was to be further reacted with a gas, it was difficult to adequately mix powder with gas because the high temperature treated powder exits the high temperature process in a narrow stream. The present invention provides an apparatus wherein the powder is dispersed with the reacting gas and therefore the reaction sites of powder-gas are increased resulting in a more efficient reaction than could be obtained without the apparatus.

Figure 1:
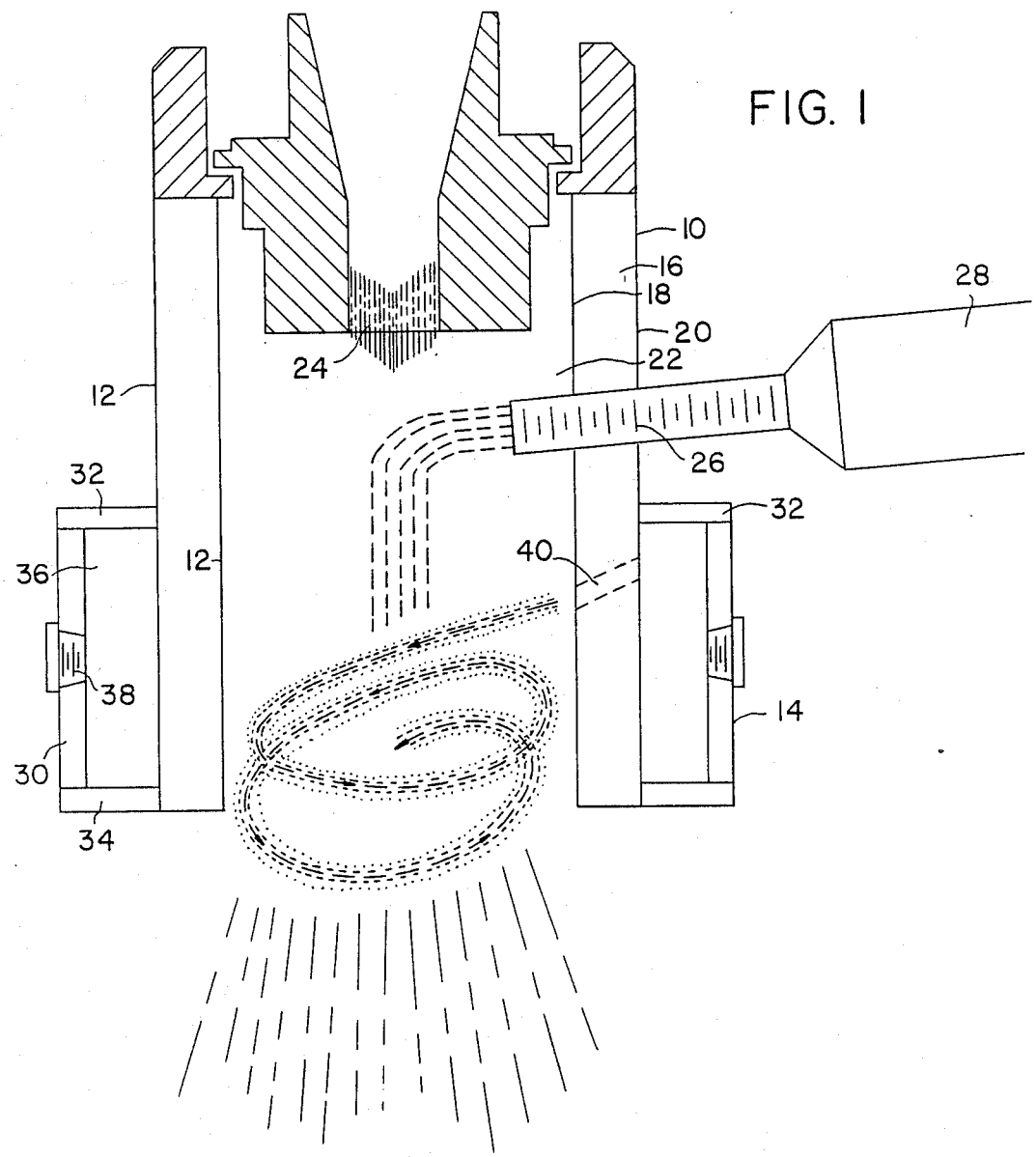
FIG. 1 is a drawing of the apparatus of the present invention.
Figure 2:
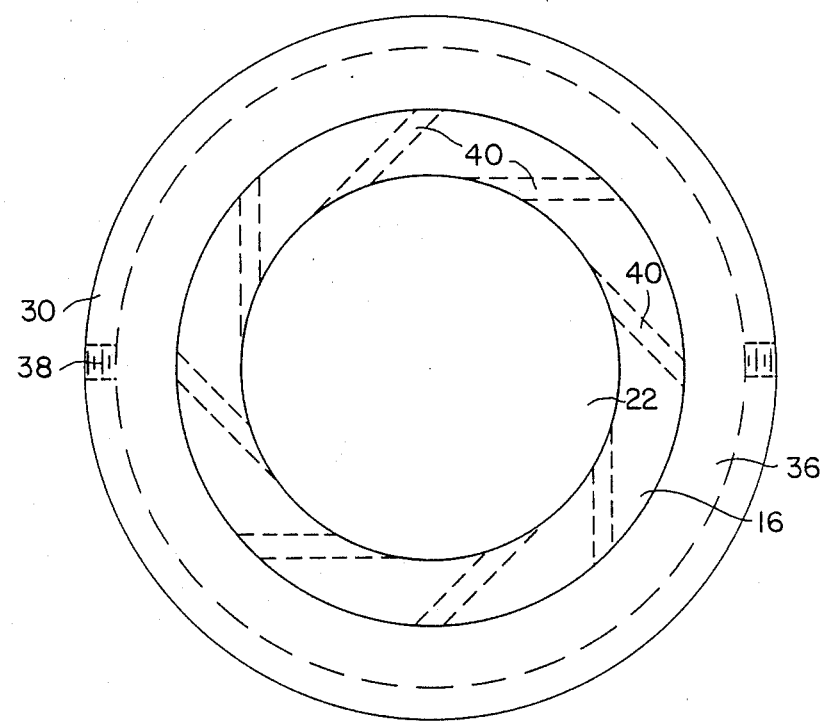
FIG. 2 is a cross section of the apparatus of the present invention showing the arrangement of the preferred number of eight inner openings tangential to the inner surface of the shroud.

The apparatus of the present invention is best described by referring to the drawings. FIG. 1 is a drawing of the apparatus of the present invention. The apparatus comprises a shroud (10). the shroud consists essentially of two main sections, a first section (12) and a second section (14). The first section has a peripheral cylindrical wall (16) with an inner surface (18) and an outer surface (20). The inner surface defines a cavity (22) which serves as a chamber in which the powder first melts and then reacts with the gas entering the chamber. This first section is detatchably mounted at its top end to the exit nozzle (24) of a high temperature source (not shown). The preferred means of mounting is by a knurled nut. The first section has one or more powder inlet openings (26) extending through the thickness of the peripheral wall (16) from the outer surface (20) to the inner surface (18) thereby connecting the outside and an outside powder source shown here as a powder injector (28) with the chamber (22). Through the powder inlet opening or openings, powder enters into the chamber to melt and to react. The powder inlet openings are positioned sufficiently close to the exit nozzle to allow the powder to reach a temperature sufficient to cause their melting. As the powder particles are melted, they are carried by the high temperature, (more preferably plasma) flame further down into the chamber and react in the molten state with the gas. The number of powder inlet openings can vary depending on the powder feed rate desired. Higher feed rates require more powder inlet openings. The second section or cylindrical jacket (14) skirts the lower part of the first section, that is, the part of the first section which is farther away from the nozzle as opposed to the top part which is the part nearer to the nozzle. The jacket is positioned below the powder inlet opening or openings. The second section or jacket has an outer peripheral wall (30) and an inner wall which is one and the same with the peripheral wall of the first section (16). There is a top ring plate (32) and a bottom ring plate (34). These ring plates form the top and bottom walls respectively of the second section or jacket. The top and bottom ring plates along with the outer peripheral wall (30) and the inner wall (16) make up the jacket. These walls of the jacket define a plenum cavity (36). The jacket has one or more outer openings (38) through the thickness of the outer peripheral wall (30) of the jacket. These outer openings connect the outside or an outside source of gas with the plenum cavity. The reacting gas enters this outer opening or openings from the outside source and pass into the plenum cavity (36). The number of these outer openings can vary. For practical purposes two are preferred. Normally there are two openings in order to minimize the pressure drop across the plenum. The second section or jacket has two or more and preferably eight inner openings (40) through the thickness of the inner wall (16) of the jacket. These openings connect the plenum cavity (36) with the chamber (22). Through these inner openings (40) the reacting gas enters the chamber (22) from the plenum cavity (36) to react with the powder in the chamber. The inner openings (40) are directed downward into the chamber and are tangential to the inner surface (18) of the shroud. The direction of the flow of the gas in the chamber is shown by the arrows. FIG. 2 is a cross section showing the arrangement of the preferred number of eight inner openings tangential to the inner surface of the shroud.

An example of reactions that proceed well when this apparatus is used are reacting copper powder with hydrogen gas to reduce the oxygen content of the copper. The oxygen levels in copper have been reduced from about 0.9% by weight to about 0.6% by weight. The oxygen content of nickel powder is reduced from about 0.13% by weight to about 830 ppm.

While there has been shown and described what are at present considered the preferred embodiments of the invention, it will be obvious to those skilled in the art that various changes and modifications may be made therein without departing from the scope of the invention as defined by the appended claims.

What is claimed is:

1. An apparatus for reacting a powder with a reacting gas, said apparatus comprising a shroud consisting essentially of a first section having a peripheral cylindrical wall with an inner surface and an outer surface, said inner surface defining a cavity which serves as a reaction chamber in which said powder and said reacting gas react, said first section being detatchably mounted at its top end to the exit nozzle of a high temperature source, said first section having one or more powder inlet openings extending through the thickness of said peripheral wall from said outer surface to said inner surface, thereby connecting the outside with said reaction chamber through which said powder enters said reaction chamber, said powder inlet openings being positioned sufficiently close to said exit nozzle to allow said powder to melt and to react with said reacting gas in the molten state, and a second section forming a cylindrical jacket skirting the lower part of said first section at a point below said powder inelt openings, said jacket having an outer peripheral wall, an inner wall which is one and the same with said peripheral wall of said first section, and top and bottom ring plates which form the top and bottom walls respectively of said second section, said walls of said second section defining a plenum, said second section having one or more outer openings through the thickness of said outer peripheral wall of said jacket which connect the outside with said plenum through which said reacting gas enters from an outside source to said plenum, said second section having two or more inner openings through the thickness of said inner wall of said second section, which connect said plenum with said reaction chamber through which said reacting gas enters said reaction chamber from said plenum to react with said powder in said reaction chamber, said inner openings being directed downward into said reaction chamber and tangential to said inner surface of said shroud, with the resulting reaction product exiting said shroud through the bottom end of said reaction chamber.

2. An apparatus of claim 1 wherein there are eight inner openings.

* * * * *